United States Patent
Feiz

(10) Patent No.: US 8,056,317 B2
(45) Date of Patent: *Nov. 15, 2011

(54) APPARATUS AND SYSTEM FOR GAS TURBINE ENGINE CONTROL

(75) Inventor: Majid Feiz, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 129 days.

This patent is subject to a terminal disclaimer.

(21) Appl. No.: 12/571,695

(22) Filed: Oct. 1, 2009

(65) Prior Publication Data

US 2010/0018183 A1 Jan. 28, 2010

Related U.S. Application Data

(62) Division of application No. 11/464,656, filed on Aug. 15, 2006, now Pat. No. 7,644,574.

(51) Int. Cl.
*F02C 9/00* (2006.01)
(52) U.S. Cl. .................................. 60/39.281; 60/39.465
(58) Field of Classification Search ............... 60/39.281, 60/39.465, 773, 776
See application file for complete search history.

(56) References Cited

U.S. PATENT DOCUMENTS

| | | | |
|---|---|---|---|
| 4,277,832 A | 7/1981 | Wong | |
| 4,716,719 A * | 1/1988 | Takahashi et al. | 60/773 |
| 5,134,845 A * | 8/1992 | Romano | 60/39.281 |
| 5,427,083 A | 6/1995 | Ahern | |
| 5,588,415 A | 12/1996 | Ahern | |
| 5,685,268 A | 11/1997 | Wakemen | |
| 6,598,589 B2 | 7/2003 | Frelund et al. | |
| 6,854,274 B2 * | 2/2005 | Keller | 60/773 |
| 6,882,924 B2 | 4/2005 | Miller | |
| 6,959,692 B2 | 11/2005 | Song et al. | |
| 7,197,878 B2 * | 4/2007 | Gainford | 60/773 |
| 7,685,802 B2 * | 3/2010 | Feiz | 60/39.281 |
| 7,752,833 B2 * | 7/2010 | Feiz | 60/39.281 |

* cited by examiner

*Primary Examiner* — Louis Casaregola
*Assistant Examiner* — Phutthiwat Wongwian
(74) *Attorney, Agent, or Firm* — Armstrong Teasdale LLP

(57) ABSTRACT

Methods and systems for controlling a dynamic response in a gas turbine fuel control system are provided. The control system includes a component model adapted to regulate a fuel supply pressure for a gas turbine, a pressure sensor adapted to sense a pressure of fuel supplied to the gas turbine, and a feedback module including integral plus state feedback, the feedback module adapted to provide a positive feedback reference signal to the component model such that a response time of the gas turbine fuel control system to changes in fuel pressure is facilitated being reduced.

7 Claims, 3 Drawing Sheets

APPARATUS AND SYSTEM FOR GAS TURBINE ENGINE CONTROL

CROSS-REFERENCE TO RELATED APPLICATIONS

This application is a divisional of U.S. patent application Ser. No. 11/464,656, filed Aug. 15, 2006 now U.S. Pat. No. 7,644,574, which is hereby incorporated by reference and is assigned to the assignee of the present invention.

BACKGROUND OF THE INVENTION

This invention relates generally to gas turbines and more particularly to fuel control systems for gas turbines.

At least some known industrial gas turbine fuel control systems rely upon steady fuel pressure upstream of a set of parallel gas control valves for proper operation. For this reason, a pressure control valve is employed immediately upstream of the set of parallel gas control valves, to regulate this pressure.

Improvement to the pressure control valve response is desirable for gas turbine fuel system pressure control. A slow response and low bandwidth may result in a poor tracking action of the control system with the controlled parameter. An algorithm that provides an improved fuel control system dynamic response, including a shorter rise time of the response and better tracking action for higher frequency command reference signals tends to improve overall turbine system operation.

BRIEF DESCRIPTION OF THE INVENTION

In one embodiment, a control system includes a component model adapted to regulate a fuel supply pressure for a gas turbine, a pressure sensor adapted to sense a pressure of fuel supplied to the gas turbine, and a feedback module including integral plus state feedback, the feedback module adapted to provide a positive feedback reference signal to the component model such that a response time of the gas turbine fuel control system to changes in fuel pressure is facilitated being reduced.

In another embodiment, a method for controlling a dynamic response of a fuel control valve in a gas turbine fuel control system includes regulating a fuel supply pressure for a gas turbine using a component model, sensing a pressure of a fuel supply to the gas turbine, and applying integral plus state feedback to the component model to facilitate at least one of reducing a response time of the fuel control valve to changes in the fuel supply pressure and increasing the bandwidth of the fuel control valve response.

In yet another embodiment, a gas turbine engine assembly includes a combustor adapted to receive a flow of fuel from a fuel supply system through a fuel supply control valve, and a control system adapted to facilitate controlling a dynamic response of the fuel supply control valve wherein the control system includes a processor adapted to regulate a fuel supply pressure to the combustor using a component model, receive a pressure signal of the fuel supply to the combustor, and apply integral plus state feedback to the component model to facilitate reducing a fuel control valve response time to a change in fuel supply pressure to the combustor.

DETAILED DESCRIPTION OF THE INVENTION

Figure 1:
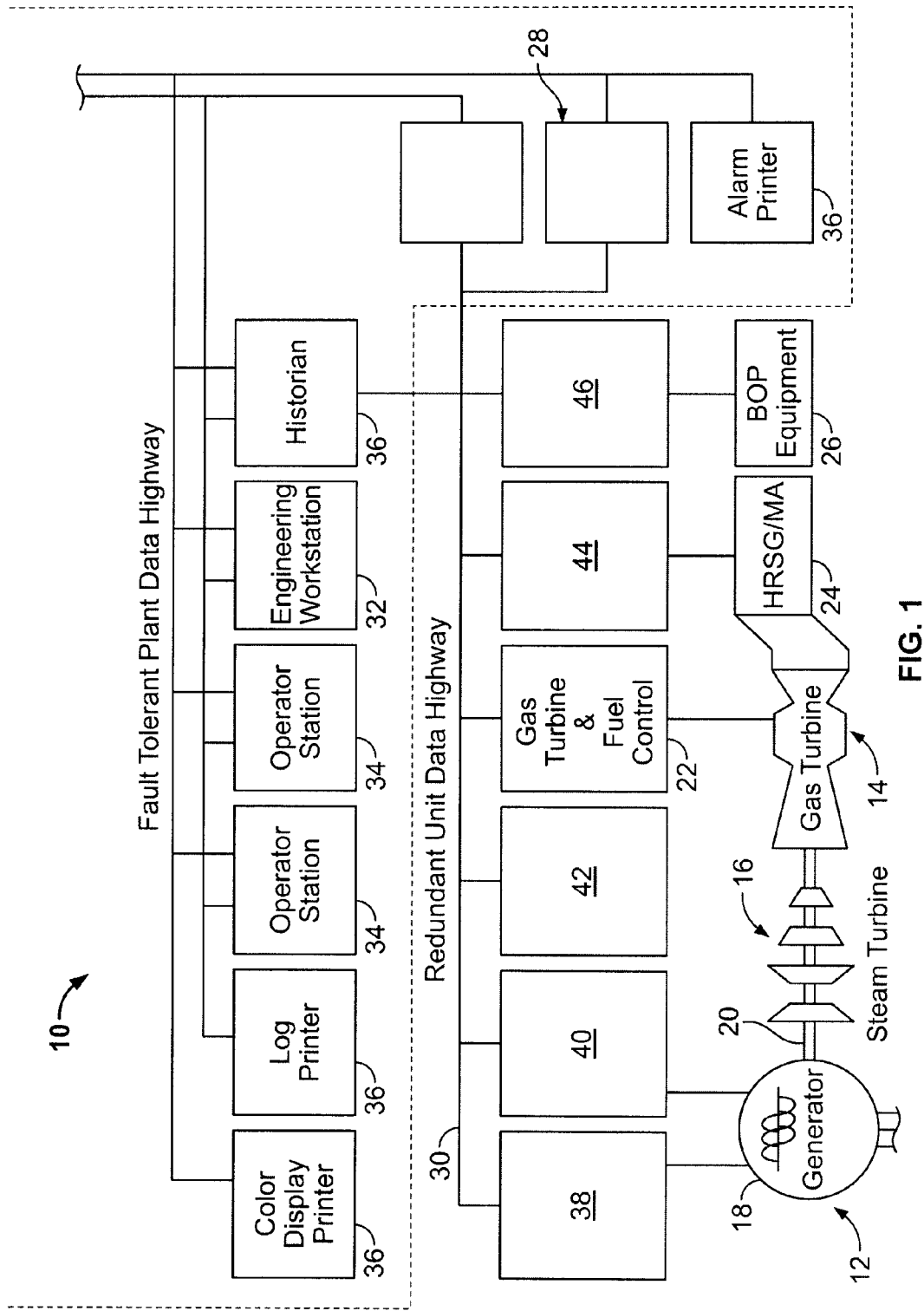
FIG. 1 is a schematic view of an exemplary control system for a power generation plant including a gas turbine engine.

FIG. 1 is a schematic view of an exemplary control system 10 for a power generation plant 12 including a gas turbine engine 14. In the exemplary embodiment, gas turbine engine 14 is coupled to a steam turbine 16 and an electric power generator 18 through a monolithic shaft 20 in a combined cycle configuration. In various other embodiments of the present invention, gas turbine engine 14 is coupled to a generator in a simple cycle gas turbine engine configuration. additional configurations of a gas turbine engine with other prime movers are also contemplated with regard to the various embodiments of the present invention.

In the exemplary embodiment, gas turbine engine 14 is controlled by control system 10 through a gas turbine and fuel control subsystem 22. Other equipment such as steam turbine 16, a heat recovery steam generator 24, and balance of plant equipment 26 are controlled by control system 10 through respective control subsystems in power generation plant 12. The respective subsystems are adapted to communicate with sensors and control members (not shown) that are coupled to the equipment and provide signals that are a function of the operating parameters of the equipment. The subsystems for each unit communicate with each other and with a plant control system 28 through a unit data bus 30 which may be a single, double redundant or triple redundant bus system. Plant control system 28 communicates with an engineering workstation 32, at least one operator workstation 34 and other display and human machine interfaces 36, such as printers and a data historian that receives and stores data transmitted to it from respective subsystems coupled through unit data bus 30.

The subsystems include for example, a generator excitation and protection subsystem 38, a static starter subsystem 40, a steam turbine and bypass control subsystem 42, heat recovery steam generator (HRSG) and steam cycle mechanical auxiliaries subsystem 44, and a unit auxiliary control subsystem 46.

Figure 2:
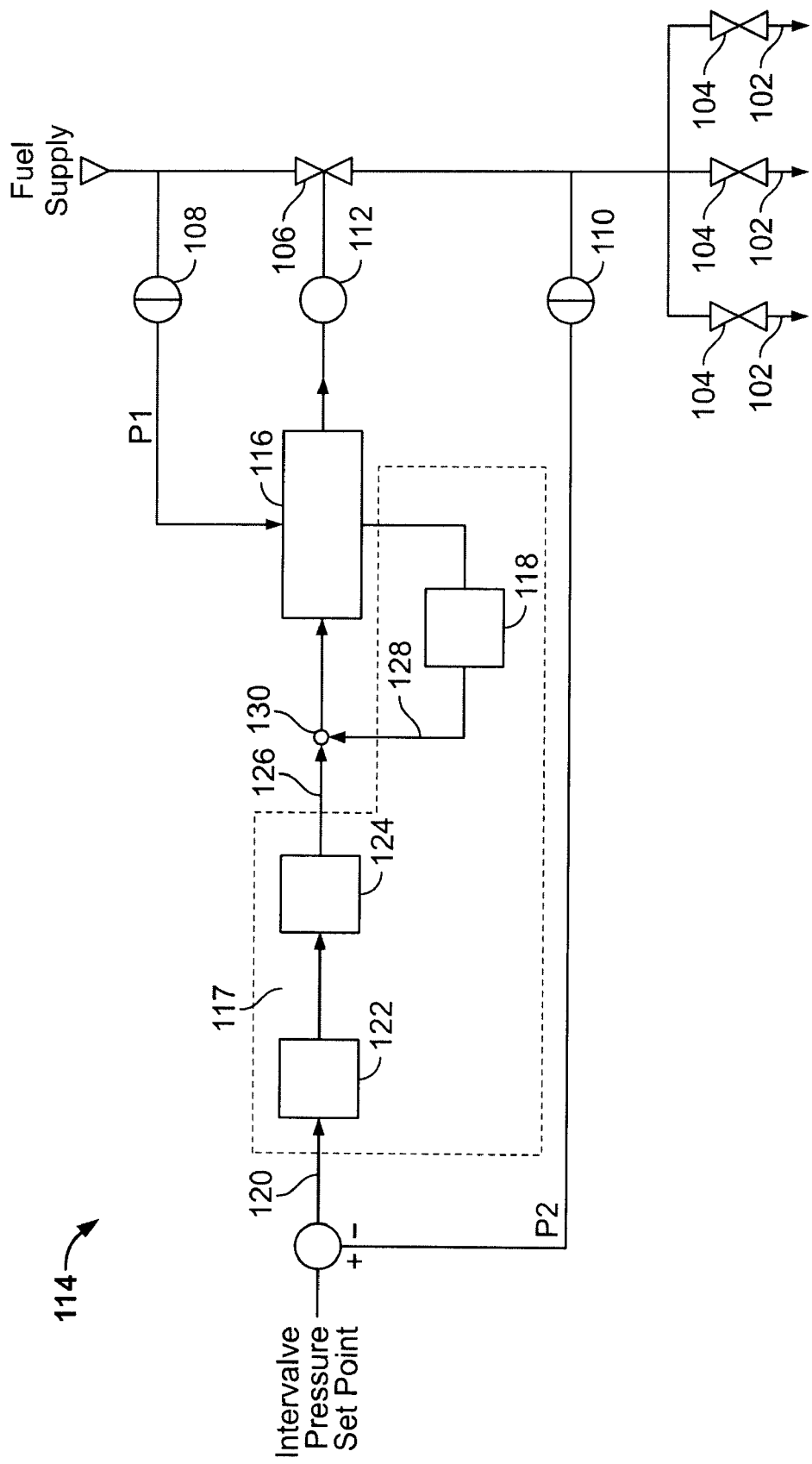
FIG. 2 is a schematic diagram of a portion of a control system that may be used with the gas turbine engine shown in FIG. 1.

FIG. 2 is a schematic diagram of a gas turbine engine fuel control portion of control system 10 that may be used with gas turbine engine 14 (shown in FIG. 1). In the exemplary embodiment, the gas turbine engine receives a supply of fuel from one or more fuel distribution lines 102 that each includes a fuel control valve 104. Fuel distribution lines 102 receive a flow of fuel from a pressure control valve 106 positioned upstream from fuel control valves 104. A fuel supply pressure sensor 108 is coupled in flow communication with the fuel supply upstream from pressure control valve 106 and an intervalve pressure sensor 110 is coupled in flow communication with the fuel supply downstream from pressure control valve 106.

Fuel supply pressure sensor 108 generates a signal P1 that is a function of the fuel supply pressure upstream from pressure control valve 106 and intervalve pressure sensor 110 generates an intervalve pressure signal P2 that is a function of the fuel control pressure downstream from pressure control valve 106. A position of pressure control valve 106 is controlled by an actuator 112 coupled to pressure control valve 106. Actuator 112 is controlled from an output y of a gas turbine engine fuel control subsystem 114.

Gas turbine engine fuel control subsystem 114 includes a component model 116 that is adapted to represent the response of the fuel supply components including the valves, piping, and sensors to process parameters affecting control system 10 and an integral plus state feedback module 117. An inner loop of integral plus state feedback module 117 is a feedback parameter 118. Fuel supply pressure signal P1 provides feedforward for fuel control subsystem 114. Intervalve pressure signal P2 is the controlled parameter of fuel control subsystem 114. Intervalve pressure signal P2 and a pressure setpoint signal from control system 10 are summed to generate an error signal 120, which is fed into an integrator 122 and a gain 124 is applied. The integrated error signal 126 and the state feedback signal 128 are combined at a summer 130. The resultant signal is transmitted to component model 116 for further processing. Uncertainties in the parameters used to describe the fuel supply components in component model 116 or disturbances acting on the fuel supply components may cause steady-state control errors. To reject such effects the state-feedback configuration is used in the inner loop of fuel control subsystem 114.

In operation, a demand for fuel may change slowly as gas turbine engines being supplied the fuel increase mechanical output to supply increasing electrical load from, for example, an electrical power grid. Additionally, the demand for fuel may change rapidly, such as a step rise due to a rapid rise in electrical demand. Pressure sensors 108 and 110 sense the pressure change in their respective lines due to the increased fuel demand. P1 provides a pressure feedforward signal to component model 116 and intervalve pressure signal P2 is summed with the intervalve pressure setpoint received from control system 10. Error signal 120 is integrated and a predetermined gain applied. The resultant integrated signal is summed with a gain adjusted state-feedback signal from component model 116. Component model then applies the model parameters and pressure feedforward signal P1 to the processed error signal to generate a control output y that is transmitted to actuator 112 to modulate pressure control valve 106 to adjust the intervalve fuel pressure back to the setpoint value. Using an integral plus state feedback control circuit in gas turbine engine fuel control subsystem 114 provides an improved dynamic response over known fuel control systems. The improved dynamic response includes a smaller rise time in response to a step change in the controlled parameter and improved tracking action for higher frequency command reference signals.

Figure 3:
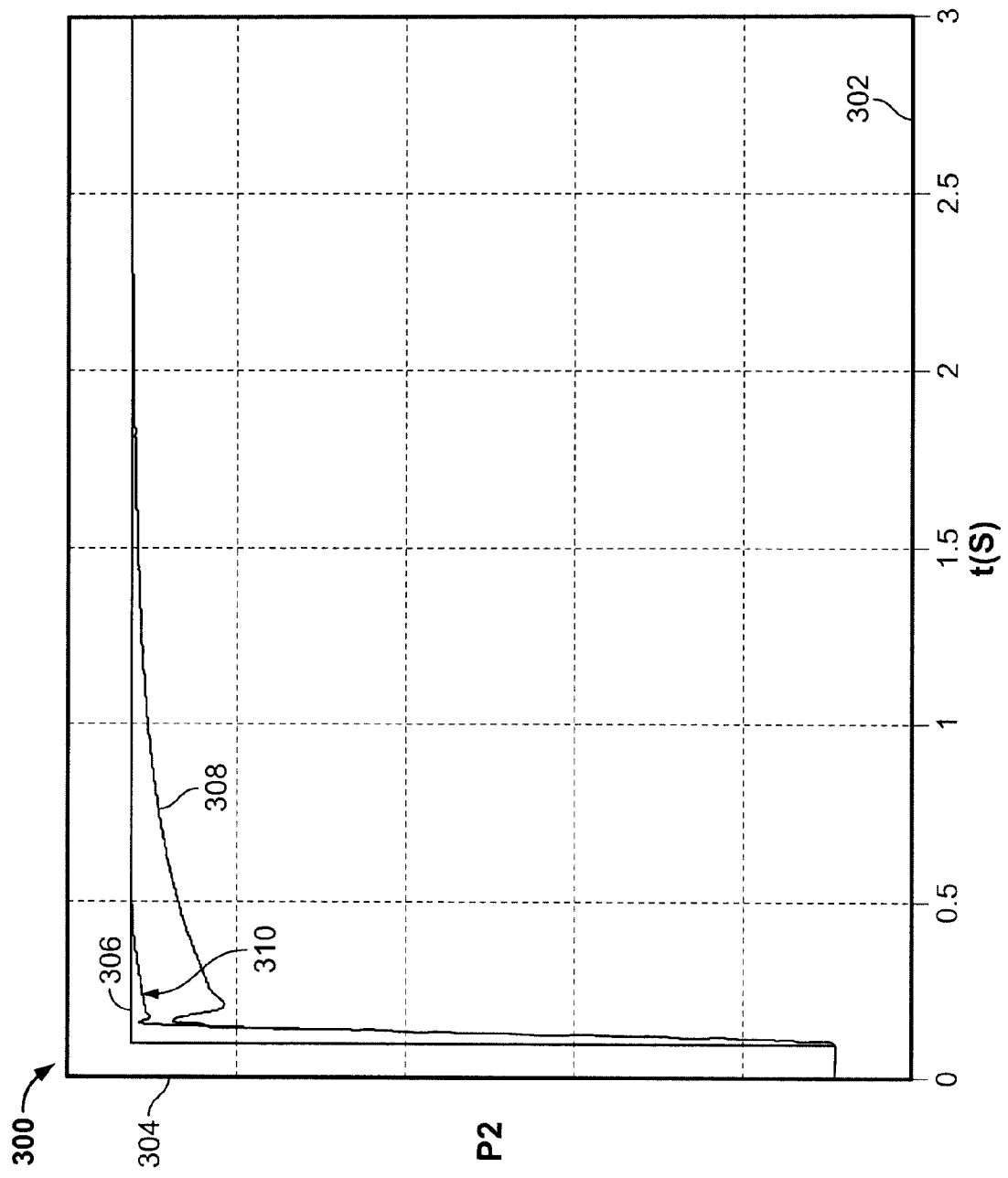
FIG. 3 is a graph illustrating a response of fuel control subsystems to a step change in intervalve pressure P2.

FIG. 3 is a graph 300 illustrating a response of fuel control subsystems to a step change in intervalve pressure P2. Graph 300 includes an x-axis 302 graduated in units of time and a y-axis 304 graduated in units of intervalve pressure P2. Graph 300 includes a trace 306 illustrating a step increase in intervalve pressure signal P2. A trace 308 illustrates a response to the step increase by a prior art gas turbine engine fuel control subsystem, and a trace 310 illustrates a response to gas turbine engine fuel control subsystem 114 in accordance with an embodiment of the present invention. In the exemplary embodiment, trace 308 attains a substantially steady state value approximately 2.41 seconds after the step change illustrated by trace 306 is initiated. Trace 310, which illustrates the response of gas turbine engine fuel control subsystem 114 in accordance with an embodiment of the present invention, attains a substantially steady state value approximately 0.48 seconds after the step change illustrated by trace 306 is initiated. The difference in response between the prior art subsystem and the subsystem in accordance with an embodiment of the present invention indicates an approximately five-fold improvement in responsiveness and a corresponding approximately five-fold improvement in bandwidth.

Although described with respect to a gas fuel supply system, embodiments of the present invention are not intended to be so limited. Accordingly, fuel supply systems controlling other forms of fuel are also able to be used in other embodiments of the present invention. Moreover, references to a fuel control valve also include other fuel flow and pressure modulating devices such as dampers, conveyors, and variable speed fans and blowers.

A technical effect of the present invention is to facilitate reducing the effect of gas fuel system supply pressure variations on regulated gas intervalve pressure.

The above-described gas turbine engine fuel supply control sub-system is cost-effective and highly reliable. The subsystem permits an improved dynamic response for the fuel supply pressure control valve such that fuel supply pressure changes due to fuel demand changes are mitigated in a relatively shorter period of time. Accordingly, the gas turbine engine fuel supply control sub-system facilitates the operation of the gas turbine engine in a cost-effective and reliable manner.

While the invention has been described in terms of various specific embodiments, those skilled in the art will recognize that the invention can be practiced with modification within the spirit and scope of the claims.

What is claimed is:

1. A gas turbine engine assembly comprising:
   a combustor adapted to receive a flow of fuel from a fuel supply system through a pressure control valve configured to control fuel supply pressure; and
   a control system adapted to facilitate controlling a dynamic response of the pressure control valve, said control system comprising a processor programmed to:
   regulate a fuel supply pressure to the combustor using a component model; receive a pressure signal of the fuel supply to the combustor;
   apply integral plus state feedback to the component model to facilitate reducing a response time of the pressure control valve to a change in fuel supply pressure to the combustor; and
   add a pressure feedback signal multiplied by a control gain to the integral signal to create an integral/sum signal.

2. An assembly in accordance with claim 1 wherein said processor is further adapted to represent a response of at least one component in the fuel supply to changes in at least one of fuel pressure and fuel flow using the component model.

3. An assembly in accordance with claim 1 wherein said processor is further adapted to represent a response of the pressure control valve to changes in the fuel pressure signal using the component model.

4. An assembly in accordance with claim 1 wherein said gas turbine fuel control system comprises a pressure sensor and interconnecting piping coupling the fuel supply to the gas turbine and wherein said processor is further adapted to represent the response of the pressure sensor and interconnecting piping in the fuel supply.

5. An assembly in accordance with claim 1 wherein said processor is further adapted to integrate a signal comprising a pressure feedback signal from the component model combined with a pressure setpoint to create an integral signal.

6. A gas turbine engine assembly comprising:
   a combustor adapted to receive a flow of fuel from a fuel supply system through a pressure control valve configured to control fuel supply pressure; and a control system adapted to facilitate controlling a dynamic response of the pressure control valve, said control system comprising a processor programmed to:

regulate a fuel supply pressure to the combustor using a component model; receive a pressure signal of the fuel supply to the combustor;

apply integral plus state feedback to the component model to facilitate reducing a response time of the pressure control valve to a change in fuel supply pressure to the combustor; and add the pressure setpoint multiplied by a feed forward gain to the integral/sum signal to produce a feedforward/integral/sum signal.

7. A gas turbine engine assembly comprising:

a fuel delivery system coupled to a fuel source and comprising a supply control valve;

a combustion chamber configured to ignite a flow of fuel supplied via said fuel delivery system through said fuel supply control valve;

a control system comprising a processor programmed to regulate a supply pressure of fuel supplied to said combustion chamber using a component model, said processor programmed to:

determine a pressure of fuel supplied to said combustion chamber; and provide a positive feedback reference signal associated with one of a fuel pressure and a fuel flow rate to the component model to facilitate reducing a response time of said fuel supply control valve to changes in a pressure of fuel supplied to said combustion chamber; and add a pressure feedback signal multiplied by a control gain to the integral signal to create an integral/sum signal.

* * * * *